United States Patent [19]
Bachman

[11] Patent Number: 6,053,384
[45] Date of Patent: Apr. 25, 2000

[54] MOUNTING SYSTEM FOR MOTORCYCLE SADDLE BAGS

[76] Inventor: Rick A. Bachman, 2224 Den Helder Dr., Modesto, Calif. 95356

[21] Appl. No.: 09/151,745
[22] Filed: Sep. 11, 1998
[51] Int. Cl.[7] ........................................................ B60R 9/00
[52] U.S. Cl. .......................... 224/430; 224/413; 224/425; 248/223.41
[58] Field of Search ..................... 224/412, 413, 224/423, 428, 431, 441, 447, 450; 248/223.41, 225.11

[56] References Cited

U.S. PATENT DOCUMENTS

| D. 394,632 | 5/1998 | Miller . | |
|---|---|---|---|
| 2,577,560 | 12/1951 | Ashdowne | 224/430 |
| 3,346,156 | 10/1967 | Jones | 224/413 |
| 3,874,574 | 4/1975 | Heise | 224/430 X |
| 4,096,980 | 6/1978 | Clow . | |
| 4,163,513 | 8/1979 | Kramer | 224/413 |
| 4,260,084 | 4/1981 | Warren, Jr. | 224/413 X |
| 4,570,887 | 2/1986 | Banister | 248/223.41 X |
| 4,588,114 | 5/1986 | Lebaron et al. | 224/431 X |
| 5,271,540 | 12/1993 | Katz et al. | 224/430 |
| 5,386,961 | 2/1995 | Lu | 224/431 X |
| 5,667,117 | 9/1997 | Nutto | 224/430 X |
| 5,732,965 | 3/1998 | Willey | 224/413 X |
| 5,762,249 | 6/1998 | Hann . | |

FOREIGN PATENT DOCUMENTS

| 240611 | 10/1987 | European Pat. Off. | 224/32 A |
|---|---|---|---|
| 477010 | 3/1992 | European Pat. Off. | 224/32 A |
| 724639 | 7/1942 | Germany | 224/32 A |

Primary Examiner—Gregory M. Vidovich
Attorney, Agent, or Firm—Heisler & Associates

[57] ABSTRACT

A system 10 is provided for removably mounting a saddle bag B on the fender strut 16 of a motorcycle. A mounting assembly 20 including a front and rear mounting bracket 40, 60 is attached to an inboard face of the bag B via a rigid backing plate 30. Two cylindrical spool-like keepers 80 are retrofitted to attach to the existing fender F and bag guard 14 mounting points on a fender strut 16. Existing mounting bolts 12 are replaced with longer replacement bolts 100. A slot 50 in each bracket 40, 60 is sized to slidably engage the neck 87 and heads 81 of each keeper 80. The bag B and bracket assembly 20 are secured to the keepers 80 via a mounting screw 66.

5 Claims, 3 Drawing Sheets

MOUNTING SYSTEM FOR MOTORCYCLE SADDLE BAGS

FIELD OF THE INVENTION

This invention relates to mounting systems for motorcycle saddle bags. More particularly, this invention relates to mounting systems where the saddle bags may be quickly and easily attached or released from the motorcycle.

BACKGROUND OF THE INVENTION

Given their inherent compact nature, motorcycles have limited ability to store items during transport. Consequently, various devices have developed to allow individuals to carry at least a limited number of articles on their motorcycles. The most popular has been the use of carrying devices commonly known as "saddle bags." Much like the "saddle bags" of the old West, where a cowboy draped two connected leather satchels over the rump of his horse, one form of saddle bag used on motorcycles is also typically suspended over the rear wheel and fender of the motorcycle.

Motorcycle saddle bags are available in two primary types: a soft leather satchel type and a hard, suitcase type. As with the saddlebags of Western origin, the soft leather satchel type bags are simply draped over the rear fender of the motorcycle. The satchels are connected to each other by a leather panel. After the satchels are draped on opposing sides of the motorcycle's rear wheel, they are typically cinched to the rear fender struts of the motorcycle using leather belt straps. The connecting leather panel distributes the load over the motorcycle's rear fender. These soft saddle bags are quickly and easily removed from the motorcycle. Consequently, the motorcycle rider is not forced to continually leave the bags on the motorcycle at all times. As a result, if no need exists to carry anything on the motorcycle, the driver can cruise with minimal wind resistance, increasing the pleasure of the ride.

However, the soft saddle bags have a tendency to move about while the motorcycle is operating. Consequently, the bags may rub against the fender and any adjacent chrome. Additionally, the leather straps used to secure the bags may scratch the paint during installation and in use. Despite their portability, soft saddle bags are more likely to mar a motorcycle's finish.

The alternative saddle bag type, hard case bags, tend to be larger than soft bags, and hence, capable of carrying a greater load. However, given their higher capacity and resulting weight, hard case bags typically have to be permanently installed to ensure that the load is properly distributed and adequately secured to the motorcycle frame. Hence, a motorcycle rider that opts for hard case saddle bags will be likely less able to enjoy an unencumbered streamlined ride, given the considerable time and effort required to remove the bags from the frame of the motorcycle. Additionally, even when the hard case saddle bags are removed, unsightly residual mounting hardware will also mar the appearance of the motorcycle.

Clow (U.S. Pat. No. 4,096,980) describes a saddle bag mounting bracket which may be adapted to fit a variety of motorcycles. Clow's bracket is complex and does not support simple attachment and release of the saddle bags. With the saddle bags removed from the bracket, an unsightly slotted bar member remains affixed to the motorcycle's frame.

Miller (U.S. Pat. No. D394,632) also describes a saddle bag mounting plate. Although less complex than the bracket described by Clow, this bracket requires permanent installation, is large and obtrusive, and also does not support simple, expeditious bag installation or removal.

Hann (U.S. Pat. No. 5,762,249) describes a motorcycle saddle bag support system for use with throw over style saddle bags used on HARLEY-DAVIDSON motorcycles. Hann's system is intended to work cooperatively with a motorcycle seat backrest. The primary purpose of this system is to prevent the soft saddle bags from getting caught in rotating elements of the motorcycle.

Accordingly, a need exists for a motorcycle saddle bag attachment and release system that allows the bags to be quickly and easily installed or removed from the motorcycle. Additionally, a need exists for such a system where the mounting hardware prevents paint or chrome on the motorcycle from being scratched without leaving unsightly hardware on the motorcycle once the saddle bags are removed.

SUMMARY OF THE INVENTION

The present invention is a system for releasably mounting saddle bags over the rear wheel of a motorcycle. The system allows one to quickly and easily install or remove either soft or hard case saddle bags from the motorcycle. The key elements of the system of the present invention are cylindrical slotted keepers which are easily integrated with existing rear fender mounting hardware. The slotted keepers are designed to slidably mate with corresponding mounting brackets attached to the inboard surface of a saddle bag. The mounting brackets are preferably attached to a backing plate which is secured to the inboard surface of the saddle bag using rivets, bolts and nuts, or other similar means of fastening.

The slotted keepers of the present invention remain attached to the motorcycle once the bags have been removed. The keepers are simple, somewhat flat cylindrical metal spools that mount to a side fender strut of the motorcycle frame using the same connection point and attachment hardware used to attach the fender. The original bolts used to secure the fender to the fender strut are replaced with slightly longer bolts to accommodate the additional length of the keeper.

The mounting brackets of the present invention somewhat resemble a leaning arch, where the interior of the arch structure is hollow. The arch of each bracket and the cylindrical surfaces of each keeper are appropriately sized so that the neck of each keeper may be slidably received within the archway or slot of a bracket, but the head of the keeper is sufficiently large to prevent it from being pulled out of the slot through the crotch.

With the brackets attached at a 45° angle to the backing plate, and, with the backing plate attached to the inboard surface of a motorcycle saddle bag, the bag and mounting bracket assembly may be positioned above the keepers, then slid down and back so that the legs of each arch of each mounting bracket straddle both sides of the neck of their correspondingly spaced keeper. The 45° tilt of the brackets ensures that wind drag or forward acceleration of the motorcycle will tend to keep the bags in place, rather than cause the bags to slide off the motorcycle. The bags and bracket assembly are secured to the rear cylindrical keeper by use of an allen head bolt which is tightened down against the neck of the rear keeper. The bags are easily removed by simply unscrewing the bolt and sliding the bags and bracket assembly up off the cylindrical keepers.

OBJECTS OF THE INVENTION

A primary object of the present invention is to provide a system for mounting both hard and soft case saddle bags that allows the bags to be quickly installed or removed with a minimal amount of effort.

Another object of the present invention is to provide such a mounting system where the appearance of the mounting system is unobtrusive when the saddle bags are removed.

Another object of the present invention is to provide such a mounting system where only a minimal amount of equipment must be added to the motorcycle.

Another object of the present invention is to provide a mounting system whose motorcycle-resident elements offer little wind resistance when the saddle bags are removed from the motorcycle.

Another object of the present invention is to provide a motorcycle saddle bag mounting system that is of simple and reliable manufacture, made from readily available materials and of reasonable cost.

Another object of the present invention is to provide such a mounting system which precludes permanent modification of any portion of the motorcycle.

Other further objects of the present invention will become apparent from a careful reading of the included drawing figures, the claims and detailed description of the invention.

DESCRIPTION OF THE PREFERRED EMBODIMENT

Figure 1:
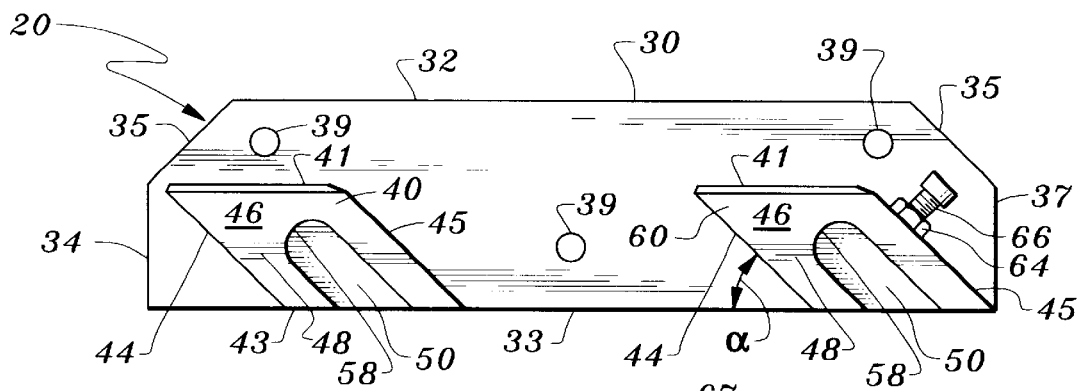
FIG. 1 is side elevation view of the bracket assembly of the present invention.
Figures 2, 3:
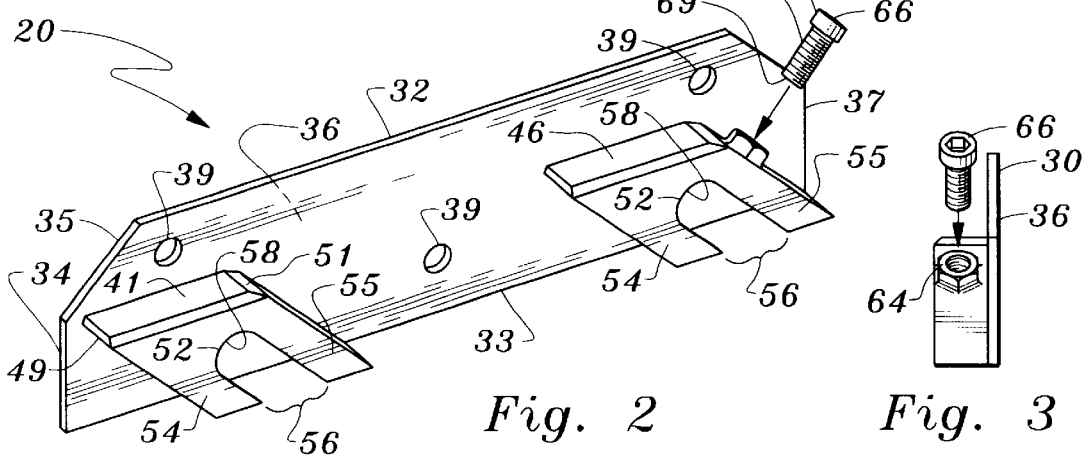
FIG. 2 is perspective view of the bracket assembly of the present invention, revealing the set screw used to secure the bracket assembly to the keepers.
FIG. 3 is an end view of the bracket assembly of the present invention.

Referring to the drawings, wherein like reference numerals represent like parts throughout the various drawing figures, reference numeral 10 (FIG. 11) is directed to a system for removably mounting saddle bags on a motorcycle. The system 10 includes frame-mounted cylindrical keepers 80 mounted to the motorcycle and sized to slidably engage with a bracket assembly 20 attached to the inboard surface of a saddle bag B.

Figure 11:
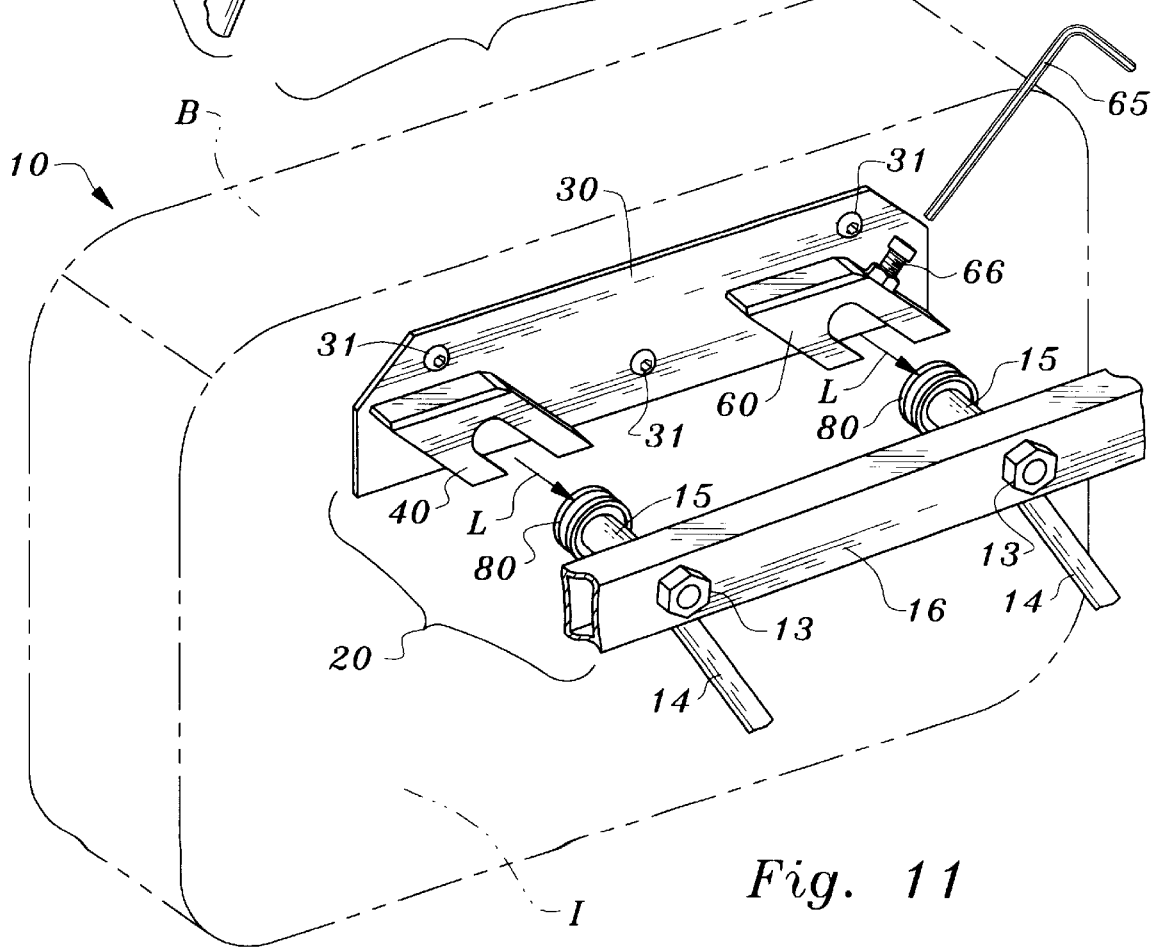
FIG. 11 is a perspective view of the bracket assembly of the present invention installed on the inboard surface of a saddle bag (drawn in phantom), with the bag positioned for slidable engagement of the mounting brackets with the keepers on the fender strut of the motorcycle.

In essence, and with initial reference to FIG. 11, the basic details of the mounting system 10 of the present invention are described. The present invention includes a mounting assembly 20 (FIG. 1) having a backing plate 30 attached to the inboard face of the saddle bag B. Two mounting brackets 40, 60 are attached to and extend from the backing plate 30. Two corresponding cylindrical keepers 80 are attached to a rear fender strut 16 of the motorcycle. The keepers 80 are sized to slidably engage within a slot 50 in the brackets 40, 60.

Figure 9:
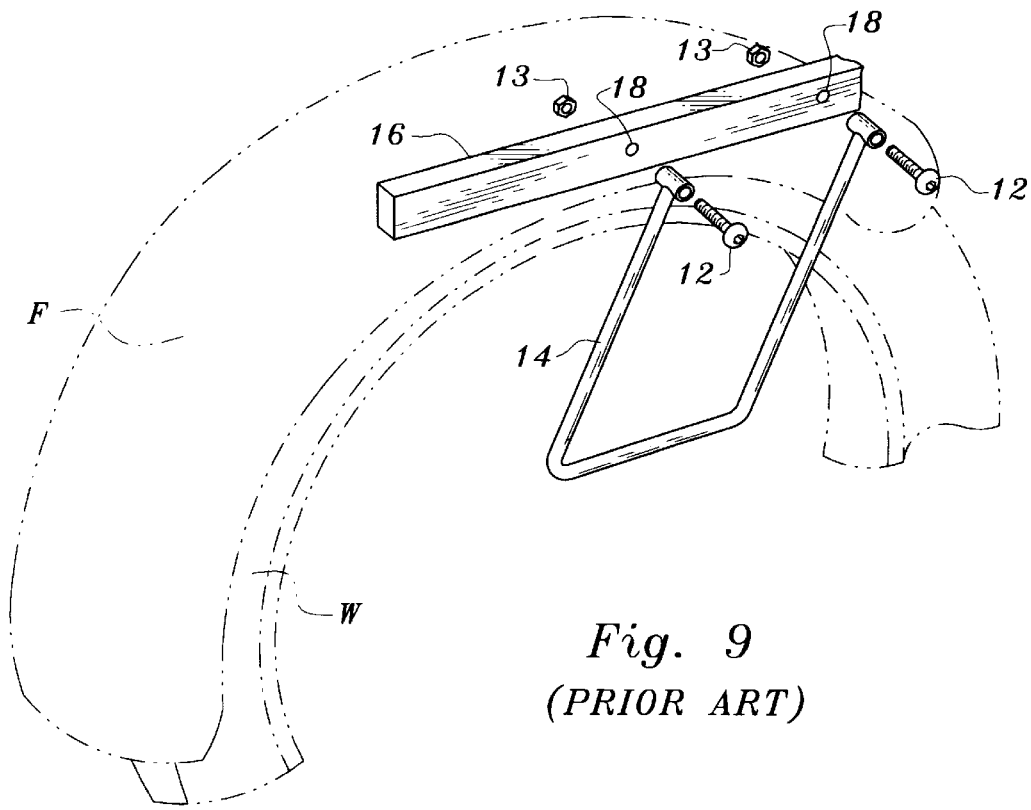
FIG. 9 is a perspective view of a U-shaped guard component used in the prior art to keep soft case saddle bags from inadvertently becoming entangled in the rotating wheels or drive assembly of the motorcycle before the slotted keeper of this invention is installed thereon.
Figure 10:
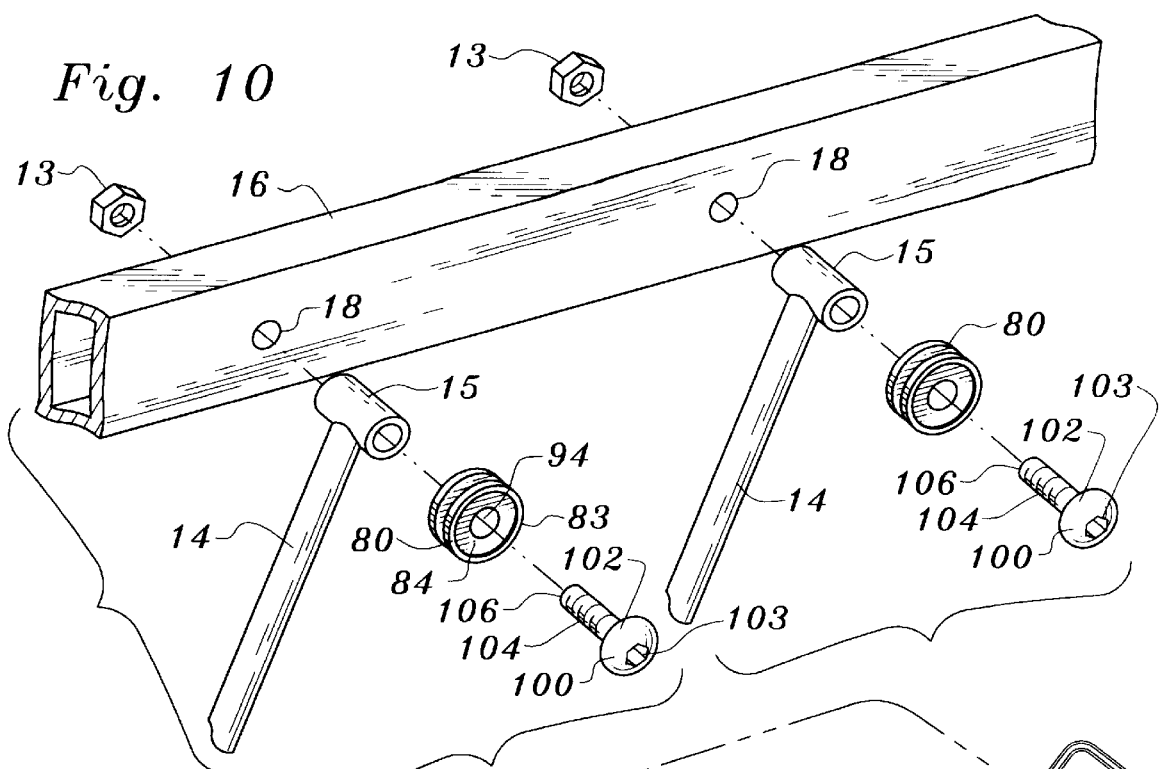
FIG. 10 is an exploded perspective view, illustrating the primary elements for attachment of the keeper of the present invention.

More particularly, and with specific initial reference to FIGS. 9–11, the details of the motorcycle structures adjacent to the mounting system 10 of the present invention are described. The system 10 is designed for conjunctive use with a swept-back U-shaped bag guard 14 of the type found in the prior art (FIG. 9). The bag guard 14 is commonly used to prevent saddle bags B from entangling with the wheel, spokes or drive train of a motorcycle. The guard 14 is attached to a rear side fender strut 16. Often this strut 16 is decoratively covered with a chrome bar. Two mounting holes 18 penetrate the rear fender strut 16, as well as the fender and any adjacent chrome bar. The holes 18 receive mounting bolts 12 which are threaded within nuts 13 to secure both the motorcycle fender F and the U-shaped guard 14 to the fender strut 16 of the motorcycle. As discussed below, the slotted keepers 80 attach between the guard 14 and the mounting bolt 12.

Figure 4:
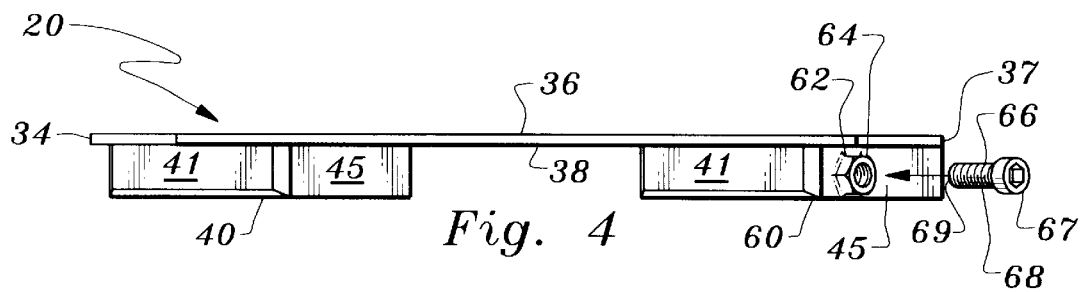
FIG. 4 is a top view of the bracket assembly of the present invention.
Figure 5:
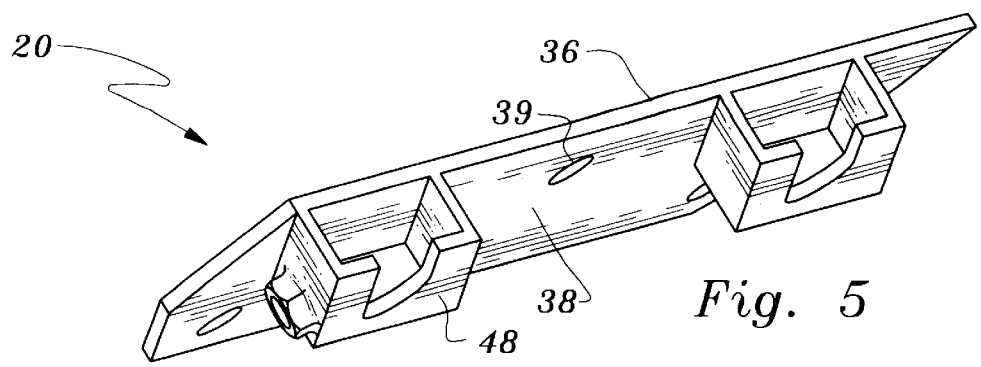
FIG. 5 is a bottom perspective view of the bracket assembly of the present invention.

With specific reference to FIG. 1, the system 10 includes a bracket assembly 20 which is attached to the inboard surface of a saddle bag B (FIG. 11). The bracket assembly 20 includes a preferably rigid backing plate 30 to which are attached two rigid mounting brackets 40, 60. The backing plate 30 is secured to an inboard surface I of the saddle bag B preferably with a bolt and nut combination, via rivets, or other similar means of permanent attachment. The backing plate 30 is preferably made of a rigid material, such as aluminum, steel, or plastic. The backing plate 30 includes three attachment holes 39 for use in securing the backing plate 30 to the inboard face of the saddle bag B. Attachment screws 31 (FIG. 11) may be used within the attachment holes 39 to join the bracket assembly 20 to the saddle bag B. The backing plate 30 includes a top edge 32 mounted most closely to the top of the saddle bag B and an opposing bottom edge 33 mounted nearer the bottom of the saddle bag B. Two opposing ends 34, 37 extend perpendicularly upward from the bottom edge of the backing plate 30. Beveled corners 35 are interposed between the ends 34, 37 of the backing plate 30 and the ends of the top edge 32. A bag face 36 (FIG. 4) of the backing plate 30 is oriented nearest the inboard surface of the saddle bag B. An opposing bracket face 38 faces away from the inboard surface of the saddle bag B. The front end 34 of the backing plate 30 is oriented nearest the front of the saddle bag B. The front of the saddle bag B is that end of the saddle bag B closest to the front wheel of the motorcycle when the saddle bag B is installed. The rear of the saddle bag B is that end opposite the front. The tail end 37 of the backing plate 30 is oriented nearest the rear of the saddle bag B.

Two substantially equivalent mounting brackets 40, 60 are attached to and extend from the bracket face 38 of the backing plate 30 (FIGS. 1–5). The brackets 40, 60 are box-shaped and preferably made of the same material as the backing plate 30. A front mounting bracket 40 is attached nearest the front end 34 of the backing plate 30, a rear mounting bracket 60 is attached nearest the tail end 37 of the backing plate 30.

The brackets 40, 60 have a top 42 and an opposing open bottom 43. The brackets 40, 60 are attached to the backing plate 30 such that the top 42 of each bracket 40, 60 is forward of its bottom 43, nearer the front end 34 of the backing plate 30. Thus attached, the brackets 40, 60 are oriented on the backing plate 30 at an approximate angle α of 45°.

Since both brackets 40, 60 are substantially identical, the following description of the front bracket 40 applies equally to the rear bracket 60. Differences in the rear bracket 60 will be described following this description of the front bracket 40.

The front mounting bracket 40 is preferably welded to the forward portion of the bracket face 38 nearest the front end 34 of the backing plate 30. The front mounting bracket 40 includes an elongate rectangular top plate 41 which extends perpendicularly from the bracket face 38 of the backing plate 30. The top plate 41 is positioned such that its planar rectangular surface is parallel to the top edge 32 of the backing plate 30. An elongate rectangular front plate 44 extends downward from the front edge 49 of the top plate 41 at an approximate angle α of 45° toward the tail end 37 of the backing plate 30 to terminate adjacent the bottom edge 33 of the backing plate 30. The front plate 44 also extends perpendicularly outward from the bracket face 38 of the backing plate 30. An opposing parallel rear plate 45 extends downward from the rear edge 51 of the top plate 41 at the same angle α to terminate adjacent the bottom edge 33 of the backing plate 30. A somewhat diamond-shaped side plate 46 is joined along its outer edges to be conterminous with the area defined by the top plate 41, the front plate 44, and the rear plate 45 of the front mounting bracket 40. Thus constructed the front mounting bracket 40 and backing plate 30 form a canted box which is open along the bottom edge 33 of the backing plate 30.

Referring still to FIGS. 1–5, the side plate 46 of the front mounting bracket 40 overlies a slot 50 and is substantially bisected by an elongate crotch 58 oriented such that its longest axis is parallel to the front and rear plates 44, 45 of the front mounting bracket 40. The slot 50 has an inverted slanted U-shape with a mouth 56 nearest the bottom 43 of the bracket 40. The slot 50 extends from its mouth 56 to terminate at the curved crotch 58 nearer the top plate 41 of the bracket 40. The crotch 58 has a radius of curvature slightly greater than that of a neck 87 of a cylindrical keeper 80. As bisected by the slot 50, the side plate 46 forms an arch 52. The arch 52 includes a front leg 54 adjacent the front plate 44 of the mounting bracket 40 and an opposing rear leg 55 adjacent the rear plate 45 of the mounting bracket 40.

A substantially equivalent rear mounting bracket 60 (FIG. 1) is attached to the backing plate 30 nearest the tail end 37 of the backing plate 30. The rear mounting bracket 60 differs from the front mounting bracket 40 only in that the rear mounting bracket 60 also includes a threaded penetration 64 located in the upper portion of its rear plate 45 nearest the top plate 41 of the bracket 60. The threaded penetration 64 threadably receives a cylindrical threaded bolt 66 (FIGS. 2–5 and 11). The bolt 66 preferably includes an allen head 67 from which extends a threaded shaft 68 of the bolt 66. The bolt 66 terminates in a tip 69.

Figure 6:
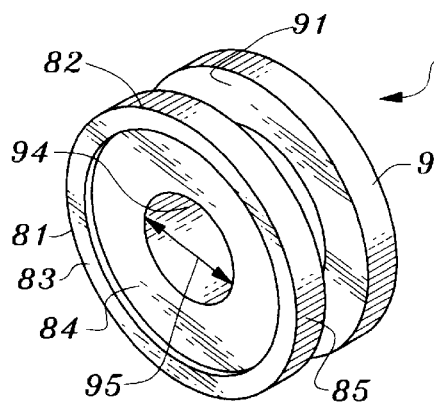
FIG. 6 is a perspective view of a slotted keeper of the present invention.
Figure 7:
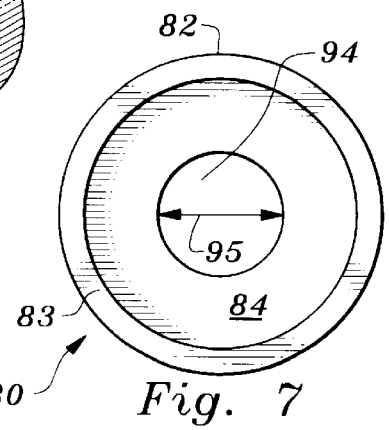
FIG. 7 is a front view of the keeper of the present invention.
Figure 8:
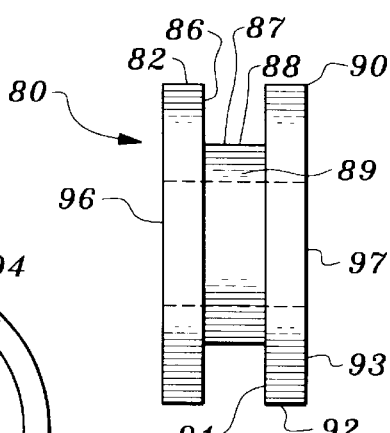
FIG. 8 is a side view of the keeper of the present invention.

With specific reference to FIGS. 6–8, the mounting system 10 also includes two cylindrical keepers 80 intended to mate with the slots 50 in the mounting brackets 40, 60. The keepers 80 are preferably cylindrical spool-like objects, preferably made from polished stainless steel. Each keeper 80 includes a circular disc-shaped base 90 from which extends a smaller diameter neck 87. The neck 87 has a diameter sufficiently small to be slidably received within the slot 50 of a mounting bracket 40, 60, yet sufficiently large to prevent excessive clearance which would allow the keeper 80 to move back and forth within the slot 50 of the bracket 40, 60. The neck 87 of the keeper 80 is capped by a disc-shaped head 81 opposite the base 90. The head 81 has a diameter which is greater than the width of the crotch 58 of the mounting bracket 40, 60 to prevent the head 81 from being pulled out of the slot 50 once the keeper 80 has been engaged with a mounting bracket 40, 60.

The head 81 of the keeper 80 has a circular annular outboard face 83. The outboard face 83 circumscribes a concentric depression 84 sized to receive a head 102 of a button head bolt 100. A narrow rim 85 wraps about the outboard face 83 and extends perpendicularly from the rim 85 toward the base 90 of the keeper 80. An annular inboard face 86 of the head 81 extends radially inward in a substantially perpendicular direction from an edge of the rim 85 nearest the base 90 of the keeper 80. The inboard face 86 of the head 81 of the keeper 80 extends inwardly from the rim 85 to join a first end of the neck 87 of the keeper 80 to form an abrupt corner.

A cylindrical wall 89 of the neck 87 of the keeper 80 extends perpendicularly from the inboard face 86 of the head 81 of the keeper 80 toward the base 90. An upper portion of the cylindrical wall 89 directed skyward forms a top surface 88 of the neck 87 of the keeper 80. The cylindrical wall 89 of the neck 87 of the keeper 80 extends from the inboard face 86 of the head 81 to terminate adjacent an inner face 91 of the base 90 of the keeper 80. The inner annular face 91 of the base of the keeper extends radially outward in a substantially perpendicular direction from the cylindrical wall 89 of the neck 87. The outer perimeter of the annular inner face 91 is circumscribed by a ring 92. The ring 92 extends rearward from the annular face 91 of the base 90 of the keeper 80 in a substantially perpendicular direction. The ring 92 terminates adjacent the perimeter of an annular bearing face 93 of the base 90 of the keeper 80.

The keeper 80 is concentrically penetrated by a bore 94 sized sufficiently to receive a bolt 100. The bore 94 includes a first end 96 nearest the head 81 of the keeper 80 and a second end 97 nearest the base 90 of the keeper 80. The bore 94 is sized to slidably receive a button head bolt 100 (FIG. 10). The bolt 100 includes a rounded button head 102 with a hexagonal allen recess 103 for tightening or loosening of the bolt 100. A threaded shank 104 extends from the button head 102 of the bolt 100 to terminate at an end 106 of the bolt 100.

The bolt 100 has sufficient length to pass through the bore 94 of a keeper 80, a mounting element 15 of the U-shaped guard 14, and the holes 18 in fender strut 16, to threadably securely engage with a nut 13. An alternative to the nut 13 is to drill out the holes 18 somewhat and press fit a threaded collar into the hole 18 having threads similar to those of the nut 13. The keeper 80 can alternatively be configured in a variety of ways, so long as the keeper has a neck and a head with the top surface of the neck below an upper surface of the head. For instance, this top surface/upper surface relationship can be provided by a keeper that is hook-like in form with the neck defined by a lower portion of the hook and head defined by an upwardly extending tip of the hook. Also, the neck and head need to be cylindrical but merely the neck should be capable of passing through the crotch and the head should be elevated above the neck so that the arch wont slide horizontally of the keeper.

With reference to FIG. 11, in use and operation, the mounting system 10 of the present invention provides a simple way and expedient method to quickly and easily install a soft or hard case saddle bag B on a motorcycle. The mounting system 10 of the present invention is intended for simple retrofit using existing hardware typically installed on the fender strut 16 of a motorcycle to prevent commonly used soft saddle bags from becoming entangled within the rotating elements of the motorcycle. FIG. 9 provides an illustration of the hardware described by the prior art used for this protective purpose. In the prior art (FIG. 9), a fender F and U-shaped bag guard 14 are both secured to the fender strut 16 of the motorcycle using mounting bolts 12. The mounting bolts 12 pass through the cylindrical attachment elements 15 of the guard 14, through mounting holes 18 in the fender strut 16, to be fastened adjacent the fender F with nuts 13. The system 10 of the present invention is installed in a similar manner by simply replacing the original mounting bolts 12 with longer replacement bolts 100 to accommodate the additional length of the keepers 80.

Hence, the keeper 80 elements of the present invention are installed over the attachment elements 15 of the guard 14. First, the original mounting bolts 12 are removed. Next, the longer replacement bolts 100 are passed through the first end 96 of the bore 94 of the keeper 80. The keeper 80 is then positioned with the bearing face 93 of the base 90 adjacent the attachment element 15 of the guard 14. The replacement bolts 100 are then passed through the attachment element 15 of the guard 14, the mounting holes 18 in the fender strut 16, and then threadably secured adjacent the motorcycle fender F using the original nuts 13. An allen wrench 65 is used for tightening the mounting screw 66 used to secure the saddle bag B and bracket assembly 20 to the rear most keeper 80 (FIG. 11).

With both keepers 80 installed, the bag B and attached bracket assembly 20 may be positioned adjacent and over the keepers 80 for installation. The bag B is lowered toward the keepers 80 so that the heads 81 of the keepers 80 locate within the brackets 40, 60 while the slots 50 of the brackets 40, 60 slidably engage the necks 87 of the keepers 80. The bag B is lowered and slid backward (as indicated by the arrows L in FIG. 11) till the crotches 58 of the slots 50 rest adjacent the top surfaces 88 of the necks 87 of the keepers 80, with the crotch 58 positioned below the upper surface 82 of the head 81 of the keeper 80. The bag B and bracket assembly 20 is then snugly secured to the motorcycle by tightening the mounting screw 66 in the threaded port 64 of the rear mounting bracket 60 against the neck 87 of the rear most keeper 80. The mounting screw 66 is tightened by rotating in a clockwise direction using the allen wrench 65. As the mounting screw 66 is tightened, the tip 69 of the screw 66 will closely pass below the head 81 of the rear keeper 80. The screw 66 is tightened until the shaft 68 of the screw has extended sufficiently past the head 81 to lock the side plate 46 of both mounting brackets 40, 60 firmly against the necks 87 of the keepers 80.

Thus secured, the bag B will not disengage from the keepers 80 during operation of the motorcycle. The 45° angle α (FIG. 1) incorporated into the mounting brackets 40, 60 and their engaging slots 50 provides an additional safeguard against inadvertent detachment of the bag B from the motorcycle if the mounting screw 66 unknowingly vibrates loose during operation of the motorcycle. Even without the mounting screw 66 secured against the neck 87 of the rear keeper 80, motorcycle acceleration and wind resistance on the bag B and bracket assembly 20 will tend to more securely frictionally engage the keepers 80 attached to the fender strut 16 of the motorcycle.

The bag B and bracket assembly 20 are removed by first loosening the mounting screw 66, then lifting the bag B and bracket assembly 20 up and over the upper surface 82 of the head 81 of the keeper 80. Once removed, only the keepers 80 remain attached to the motorcycle.

This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure. When structures are identified as a means to perform a function, the identification is intended to include all structures which can perform the function specified.

What is claimed is:

1. A system for mounting a saddle bag to a motorcycle, the system comprising in combination:

at least one keeper adapted to extend from a surface of the motorcycle, said keeper including a neck and a head attached to said neck and on a side of said neck opposite the motorcycle;

said neck having an uppermost portion which extends non-vertically away from the motorcycle;

said head having a highest portion which is at least partially higher than said uppermost portion of said neck, such that items resting on said neck must move upward before being able to pass over said head and off of said keeper;

at least one mounting bracket adapted to extend from a surface of the saddle bag, said mounting bracket including an arch;

said arch having a front leg, a rear leg and a crotch between said front leg and said rear leg, said front leg and said rear leg each extending down to a position below said crotch;

said crotch of said arch having a width at least as great as a width of said neck, such that said crotch of said arch is capable of straddling said neck with said front leg on one side of said neck and with said rear leg on another side of said neck;

wherein said arch is formed as a plate with opposite surfaces both at least partially exposed and spaced apart by a distance defining a thickness of said arch, and wherein a length of said neck is at least as great as a thickness of said arch;

wherein a horizontal width of said head is greater than a horizontal width of said crotch;

wherein said neck is cylindrical with a center line oriented substantially horizontal;

wherein said head is cylindrical with a center line colinear with said center line of said neck; and wherein said bracket includes a threaded port at a position below a center of said head when said neck is located entirely within said crotch, and a threaded set screw sized to fit through said threaded port enough to block removal of said head out of said bracket when said neck is entirely within said crotch.

2. The system of claim 1 wherein said system includes a backing plate to which said bracket is attached, said backing plate fastened to the saddle bag, said bracket having said arch located parallel to and spaced from said backing plate by a slot, said slot at least as wide as a length of said head away from said neck, such that said slot has sufficient room to allow said handle to slide into said slot.

3. The system of claim 2 wherein said backing plate is attached to the saddle bag by removable fasteners.

4. A motorcycle having a readily removable and remountable saddle bag, the motorcycle comprising in combination:

at least two wheels;

a motorcycle frame having said wheels rotatably attached to the motorcylce frame, said motorcycle frame including a fender strut;

an engine attached to said frame, said engine including a means for delivering power to at least one of said wheels;

a seat attached to said frame;

at least one keeper extending from the fender strut of said motorcycle frame said keeper including a neck and a head on a side of said neck opposite said motorcycle, said head having at least a portion thereof located above a portion of said neck;

at least one mounting bracket extending from a surface of the saddle bag, said mounting bracket having an arch with a crotch extending between a front leg and a rear leg of said arch, said crotch having a maximum height which is above at least a portion of said front leg and at least a portion of said rear leg, said crotch at least as wide as a width of said neck;

wherein said arch is spaced from the saddle bag by a space, said space having a width between the saddle bag and said arch at least as great as a thickness of said head, said crotch having a width greater than a width of said neck and less than a width of said head, such that said neck of said keeper slides into and out of said crotch with said head sliding into said space between said arch and the saddle bag with said crotch sized to prevent said head from passing through said crotch, such that said mounting bracket slidably receives said keeper into said arch and said space; and wherein said neck of said keeper is cylindrical in form with a bore passing through a central axis of said neck and passing through said head, and wherein a bolt is located within said bore and attaches to said motorcycle frame, said fender strut of said neck having said central axis oriented substantially horizontally and substantially perpendicular to a direction of travel of said motorcycle.

5. A motorcycle having a readily removable and remountable saddle bag, the motorcycle comprising in combination:

at least two wheels;

a frame rotatably attached to said wheels;

an engine attached to said frame, said engine including a means for delivering power to at least one of said wheels;

a seat attached to said frame;

at least one keeper extending from a portion of said motorcycle, said keeper including a neck and a head on a side of said neck opposite said motorcycle, said head having at least a portion thereof located above a portion of said neck;

at least one mounting bracket extending from a surface of the saddle bag, said mounting bracket having an arch with a crotch extending between a front leg and a rear leg of said arch, said crotch having a maximum height which is above at least a portion of said front leg and at least a portion of said rear leg, said crotch at least as wide as a width of said neck;

wherein said arch is spaced from the saddle bag by a space, said space having a width between the saddle bag and said arch at least as great as a thickness of said head, said crotch having a width greater than a width of said neck and less than a width of said head, such that said neck of said keeper slides into and out of said crotch with said head sliding into said space between said arch and the saddle bag with said crotch sized to prevent said head from passing through said crotch, such that said mounting bracket slidably receives said keeper into said arch and said space;

wherein said crotch and said arch are oriented to extend linearly parallel to said front leg and said rear leg, said front leg, said rear leg and said crotch oriented skewed with respect to vertical and horizontal with upper portions of said front leg and said rear leg located forward of lower portions of said front leg and said rear leg relative to a forward portion of said motorcycle;

wherein said motorcycle includes at least two keepers oriented horizontally spaced from each other and at least two mounting brackets oriented horizontally spaced from each other by a distance similar to a distance between said at least two keepers, each said keeper configured similar to the other said keeper, each said mounting bracket configured similar to the other said mounting brackets, each said mounting bracket located on a common backing plate, said backing plate attached to the saddle bag, said space defined as a slot locked between said backing plate and said arch, a rear one of said mounting brackets including a threaded port passing into said slot of said rear mounting bracket at a location below said head of said keeper when said keeper is located entirely within said rear mounting bracket; and a threaded bolt sized to thread into said threaded port in a manner blocking said keeper from sliding out of said slot of said rear mounting bracket when said bolt is tightened into said threaded port.

* * * * *